United States Patent [19]

Kitamura et al.

[11] Patent Number: 5,248,733
[45] Date of Patent: Sep. 28, 1993

[54] PROCESS FOR PRODUCING MATTE VINYL CHLORIDE POLYMERS

[75] Inventors: Hajime Kitamura, Ichihara; Ichiro Kaneko, Ibaraki, both of Japan

[73] Assignee: Shin-Etsu Chemical Co., Ltd., Tokyo, Japan

[21] Appl. No.: 726,577

[22] Filed: Jul. 8, 1991

[30] Foreign Application Priority Data

Jul. 17, 1990 [JP] Japan .................................. 2-189215

[51] Int. Cl.⁵ ..................... C08F 257/02; C08F 265/04
[52] U.S. Cl. .................................... 525/317; 525/308; 525/305; 525/302; 525/239; 525/262
[58] Field of Search ............... 525/317, 298, 302, 303, 525/304, 305, 308

[56] References Cited

U.S. PATENT DOCUMENTS

| | | | |
|---|---|---|---|
| 3,907,730 | 9/1975 | Jones | 525/317 |
| 3,929,933 | 12/1975 | Gallagher | 525/226 |
| 3,969,431 | 7/1976 | Gallagher | 525/308 |
| 3,988,393 | 10/1976 | Gallagher | 525/226 |
| 4,914,154 | 4/1990 | Haller et al. | 525/80 |
| 4,978,718 | 12/1990 | Haller et al. | 525/239 |
| 4,981,907 | 1/1991 | Klipperf et al. | 525/317 |

*Primary Examiner*—James J. Seidleck
*Assistant Examiner*—M. L. Warzel
*Attorney, Agent, or Firm*—McAulay Fisher Nissen Goldberg & Kiel

[57] ABSTRACT

Matte vinyl chloride polymers are prepared by suspension polymerizing a vinyl chloride monomer or a vinyl monomer mixture mainly comprising vinyl chloride in an aqueous medium in the presence of (A) a polyfunctional monomer having at least two ethylenic double bonds in a molecule and (B) a polymeric matting agent containing 3 to 25% by weight of a tetrahydrofuran-insoluble gel fraction. The polymers are effectively moldable and present uniform matte effect.

3 Claims, No Drawings

PROCESS FOR PRODUCING MATTE VINYL CHLORIDE POLYMERS

This invention relates to a process for producing matte vinyl chloride polymers and more particularly, to a process for producing matte vinyl chloride base polymers which are readily moldable, minimized in compression set and ensure uniform matte appearance to molded parts.

BACKGROUND OF THE INVENTION

Vinyl chloride polymers which are moldable into parts having a matte surface are produced by suspension polymerizing a vinyl chloride monomer or a vinyl monomer mixture mainly comprising vinyl chloride in an aqueous medium. It is known from Japanese Patent Application Kokai No. 134793/1979 to produce matte vinyl chloride polymers by adding a crosslinking agent in the form of a polyfunctional monomer having at least two ethylenic double bonds in its molecule to the vinyl chloride monomer or vinyl monomer mixture mainly comprising vinyl chloride.

The matte vinyl chloride polymers obtained by this method are often used as hoses, packings, conductor insulators, vacuum forming sheets and the like since they have rubbery elasticity and low creep. Undesirably, they are rather difficult to mold.

The recently increasing commercial use of matte vinyl chloride polymers is accompanied by a demand for higher quality. Especially for use as films and sheets, there is a need for polymers of quality in that they are effectively moldable into parts having uniform matte appearance.

SUMMARY OF THE INVENTION

Therefore, an object of the present invention is to meet such needs and to provide a new and improved process for producing matte vinyl chloride base polymers which are readily moldable, minimized in compression set and ensure uniform matte appearance to molded parts.

The present invention is directed to a process for producing a matte vinyl chloride polymer comprising the step of suspension polymerizing a vinyl chloride monomer or a vinyl monomer mixture mainly comprising vinyl chloride in an aqueous medium. We have found that when polymerization is carried out in the presence of (A) 0.005 to 0.2 parts by weight of a polyfunctional monomer having at least two ethylenic double bonds in a molecule and (B) 0.1 to 20 parts by weight of a polymeric matting agent containing 3 to 25% by weight of a tetrahydrofuran insoluble gel fraction per 100 parts by weight of the vinyl chloride monomer or the vinyl monomer mixture, there is obtained a matte vinyl chloride polymer of quality which can be effectively moldable into parts having minimized compression set and improved matte appearance.

More particularly, in producing vinyl chloride base polymers by suspension polymerization, a polyfunctional monomer having at least two ethylenic double bonds in its molecule is added to the polymerization system for the purpose of matting the vinyl chloride base polymers. However, the single addition of such a polyfunctional monomer results in less moldable polymers. As the amount of a polyfunctional monomer added is increased, the resulting sheets become of inferior quality in that many fish-eyes are present. In turn, if a polymeric matting agent is added alone to the polymerizing system, the resulting matte effect is insufficient. That is, the addition of either one of the polyfunctional monomer and the polymeric matting agent fails to produce matte vinyl chloride base polymers of quality. Quite unexpectedly, we have found that a matte vinyl chloride base polymer of quality which can be effectively moldable into parts having minimized compression set and improved matte appearance is obtained by adding both a polyfunctional monomer having at least two ethylenic double bonds in a molecule and a polymeric matting agent containing 3 to 25% by weight of a tetrahydrofuran-insoluble gel fraction to the polymerizing system.

DESCRIPTION OF THE PREFERRED EMBODIMENTS

Broadly stated, according to the present invention, matte vinyl chloride polymers are produced by suspension polymerizing a vinyl chloride monomer or a vinyl monomer mixture mainly comprising vinyl chloride in an aqueous medium in the presence of (A) a polyfunctional monomer and (B) a polymeric matting agent.

The polyfunctional monomer (A) is a monomer having at least two ethylenic double bonds in its molecule. Examples of the polyfunctional monomer include diallyl esters of phthalic acid such as diallyl isophthalate and diallyl terephthalate;

diallyl esters and divinyl esters of ethylenically unsaturated dibasic acids such as diallyl maleate, diallyl fumarate, diallyl itaconate, divinyl itaconate, and divinyl fumarate;

diallyl esters and divinyl esters of saturated dibasic acids such as diallyl adipate, divinyl adipate, diallyl azelate, and diallyl sebacate;

divinyl ethers such as diallyl ether, triallyl cyanurate, triallyl isocyanurate, triallyl trimellitate, ethylene glycol divinyl ether, n-butanediol divinyl ether, and octadecane divinyl ether;

vinyl esters and allyl esters of acrylic acid and methacrylic acid such as vinyl acrylate, vinyl methacrylate, allyl acrylate and allyl methacrylate;

diacrylic esters and dimethacrylic esters of polyhydric alcohols such as ethylene glycol dimethacrylate, diethylene glycol dimethacrylate, triethylene glycol dimethacrylate, diethylene glycol diacrylate, triethylene glycol diacrylate, and polyethylene glycol diacrylate;

triacrylic esters and trimethacrylic esters of polyhydric alcohols such as trimethylolpropane trimethacrylate, trimethylolethane trimethacrylate, trimethylolpropane triacrylate, trimethylolethane triacrylate, and tetramethylolmethane triacrylate; and unsaturated bond-containing low-molecular weight polymers (having a molecular weight of 500 to 3,000) such as bismethacryloyloxyethylene phthalate, 1,3,5-triacryloylhexahydrotriazine, and 1,2-butadiene homopolymer, alone and in admixture of two or more.

Polyfunctional monomer (A) is used in an amount of 0.005 to 0.2 parts by weight, preferably 0.01 to 0.1 parts by weight per 100 parts by weight of the vinyl chloride monomer or the vinyl monomer mixture. Less than 0.005 parts of polyfunctional monomer (A) is too small to provide the desired matte effect whereas more than 0.2 parts adversely affects the processability of polymers.

Component (B) is a polymeric matting agent consisting essentially of 3 to 25% by weight of a tetrahydrofuran-insoluble gel fraction and the balance of a tetrahydrofuran-soluble fraction. Preferred polymeric matting agents are those polymers obtained by adding a polyfunctional monomer having at least two ethylenic double bonds in a molecule to a non-crosslinking monomer mixture mainly comprising an aromatic vinyl monomer and an alkyl (meth)acrylate monomer and polymerizing the monomers. Both of polyfunctional monomer (A) and polymeric matting agent (B) must be added to the polymerization system before the objects of the present invention can be attained.

The non-crosslinking monomer mixture used in preparing polymeric matting agent (B) is mainly comprised of an aromatic vinyl monomer and an alkyl (meth)acrylate. The aromatic vinyl monomers include styrene and α-methylstyrene. The alkyl (meth)acrylates are preferably those having a $C_{1-13}$ alkyl group, for example, methyl acrylate, ethyl acrylate, butyl acrylate, methyl methacrylate, ethyl methacrylate, butyl methacrylate. The non-crosslinking monomer mixture may contain another monomer or monomers, for example, monoethylenically unsaturated monomers such as acrylonitrile. The proportion of these monomers used is not particularly limited although it is desired to use 40 to 80 parts by weight, especially 50 to 70 parts by weight of an aromatic vinyl monomer, 20 to 60 parts by weight, especially 30 to 50 parts by weight of an alkyl (meth)acrylate, and 0 to 40 parts by weight, especially 0 to 20 parts by weight of an ethylenically unsaturated monomer. The polyfunctional monomer having at least two ethylenic double bonds in a molecule which is added to and polymerized with the non-crosslinking monomer mixture may be selected from the examples previously mentioned for component (A). Such a polyfunctional monomer or monomers are desirably added in an amount of 0.05 to 0.5 part by weight per 100 parts by weight of the non-crosslinking monomer mixture. Polyethelene glycol di(meth)acrylate is the most preferred polyfunctional monomer in this case. The non-crosslinking monomers and the polyfunctional monomer may be polymerized by any desired well-known methods such as suspension polymerization. The resulting polymer should have a gel fraction insoluble in tetrahydrofuran (THF) of 3 to 25%, preferably 5 to 20% by weight as measured in the Example. A polymer containing less than 3% by weight of a THF-insoluble gel fraction imparts a less uniform matte effect to the molded part appearance whereas with more than 25% by weight of a THF-insoluble gel fraction, the resulting sheets contain many fish-eyes causing unevenness of printing.

Polymeric matting agent (B) is used in an amount of 0.1 to 20 parts by weight, preferably 1 to 10 parts by weight per 100 parts by weight of the vinyl chloride monomer or the vinyl monomer mixture. Less than 0.1 part of polymeric matting agent (B) is too small to provide the desired matte effect whereas more than 20 parts adversely affects the processability of vinyl chloride polymers.

Polyfunctional monomer (A) and polymeric matting agent (B) may be added to the polymerization system at any time insofar as they are present in the necessary amounts during polymerization. For example, they may be added all at once before the start of polymerization; they may be added partly before the start of polymerization, with the remainder being added in portions during polymerization; or they may be added in portions or continuously during polymerization. In the case of polymeric matting agent (B), it is recommended to add the agent to the system by pulverizing the agent. The powdery agent is admitted into the polymerization system before the start of polymerization, and agitated and mixed with the vinyl chloride monomer or the vinyl monomer mixture so that the agent is dissolved or dispersed in the monomer or monomers.

The polymer forming raw material used in the preparation of matte vinyl chloride polymers according to the present invention is monomeric vinyl chloride or a mixture of a major proportion (typically 50% by weight or more) of vinyl chloride and a copolymerizable vinyl monomer(s) or comonomer(s). Examples of the comonomer include vinyl esters such as vinyl acetate and vinyl propionate; acrylic esters and methacrylic esters such as methyl acrylate and ethyl acrylate; olefins such as ethylene and propylene; maleic anhydride; acrylonitrile; styrene; vinylidene chloride; and other monomers copolymerizable with vinyl chloride.

The manner of carrying out the suspension polymerization of a vinyl chloride monomer and an optional comonomer in an aqueous medium in the presence of (A) a polyfunctional monomer having two or more ethylenical double bonds in its molecule and (B) a polymeric matting agent is not particularly limited. If desired, dispersants and polymerization initiators commonly used for the polyerization of vinyl chloride are added in commonly used amounts.

Examples of the dispersant include water-soluble celluloses such as methyl cellulose, hydroxyethyl cellulose, hydroxy propyl cellulose, and hydroxypropyl methyl cellulose; water-soluble partially saponified polyvinyl alcohols having a degree of saponification of 75 to 99 mol % and an average degree of polymerization of 1,500 to 2,700; acrylic acid polymers; water-soluble polymers such as gelatin; oil-soluble emulsifiers such as sorbitan monolaurate, sorbitan trioleate, glycerin tristearate, and ethylene oxide-propylene oxide block copolymers; and water-soluble emulsifiers such as polyoxyethylene sorbitan monolaurate, polyoxyethylene glycerin oleate, and sodium laurate, alone and in admixture of two or more. The amount of the dispersant added should preferably range from 0.01 to 1 part by weight per 100 parts by weight of the vinyl chloride or vinyl monomer mixture.

Examples of the initiator include percarbonate compounds such as diisopropyl peroxydicarbonate, di-2-ethylhexyl peroxydicarbonate, and diethoxyethyl peroxydicarbonate; perester compounds such as t-butyl peroxypivalate, t-hexyl peroxypivalate, t-butyl peroxyneodecanate, and α-cumyl peroxyneodecanate; peroxides such as acetylcyclohexyl sulfonyl peroxide, 2,4,4-trimethylpentyl-2-peroxyphenoxy acetate, and 3,5,5-trimethyl hexanoyl peroxide; azo compounds such as azobis-2,4-dimethylvaleronitrile and azobis(4-methoxy-2,4-dimethyl valeronitrile); and potassium persulfate, ammonium persulfate, and hydrogen peroxide, alone and in admixture of two or more. The amount of the initiator added should preferably range from 0.01 to 1 part by weight per 100 parts by weight of the vinyl chloride or vinyl monomer mixture.

If desired, the polymerization system may contain a polymerization regulator, chain transfer agent, pH regulator, gelation improver, antistatic agent, antioxidant, and scale inhibitor.

In the practice of the process of the present invention, the polymerization may be performed under substantially the same conditions as the ordinary polymerization of vinyl chloride. In other words, no specific restrictions are imposed on the manner of charging the polymerizer with an aqueous medium, vinyl chloride monomer, and optional comonomer, dispersant, and initiator as well as the proportion of these reactants. The polymerization temperature is usually 20° to 80° C. which is also common for the ordinary polymerization of vinyl chloride.

The matte vinyl chloride base polymers thus obtained are of quality in that they are readily moldable or formable, low in compression set, and improved in matte effect. They may be used alone or in combination with other thermoplastic resins or rubbers, for example, vinyl chloride resin, polyethylene, ABS resin, urethane resin, acrylic resin, acrylonitrilebutadiene rubber (NBR), and chloroprene rubber (CR) along with optional processing aids such as plasticizers to mold or form matte articles, especially films and sheets.

There has been described a process for producing a matte vinyl chloride base polymer which is effectively formed into articles having minimal compression set and uniform matte appearance.

EXAMPLE

Examples of the present invention are given below together with comparative examples, by way of illustration and not by way of limitation. All parts are by weight.

Preparation of Matting agent

A reactor equipped with a cooler was charged with the following compounds.

| Compound | Parts by weight |
| --- | --- |
| Styrene | 60 |
| Methyl methacrylate | 20 |
| Butyl methacrylate | 20 |
| Polyethylene glycol dimethacrylate | 0.5 |
| n-octyl mercaptan | 0.1 |
| Azobisisobutyronitrile | 2 |
| Calcium tertiary phosphate | 2 |
| Water | 200 |

The reactor interior was thoroughly purged with nitrogen gas. With stirring, the contents were heated to 75° C. whereupon polymerization was effected at the temperature for 3 hours in the nitrogen atmosphere. Then the reaction system was heated to 85° C., maintained at the temperature for further 3 hours, again heated to 95° C., and maintained at the temperature for a further 1 hour to complete polymerization. After cooling, water removal, and drying, there were obtained beads. This is designated polymeric matting agent A.

The beads were measured for a THF-insoluble gel fraction by the following method. The THF-insoluble gel fraction was 15% by weight.

By following the above procedure, a series of polymeric matting agents B to E were prepared as shown in Table 1. They were also measured for a THF-insoluble gel fraction, with the results shown in Table 1.

Tetrahydrofuran-Insoluble Gel Fraction

To 100 ml of tetrahydrofuran (THF) was added 1 gram of a polymeric matting agent. The mixture was agitated for thorough mixing while heating to 60° C. After agitation and heating, the mixture was allowed to stand for 24 hours. The supernatant, 10 ml, was collected and evaporated to dryness. The residual polymer was weighed. A percent THF-insoluble gel fraction was calculated from the weight of the residue according to the following formula.

$$\text{THF-insoluble gel fraction (wt \%)} = 100 - \frac{\text{residue (g)} \times 10}{1 \text{ (g)}} \times 100$$

TABLE 1

| | Polymeric matting agent | | | | |
| --- | --- | --- | --- | --- | --- |
| | A | B | C | D | E |
| Composition, pbw | | | | | |
| Styrene | 60 | 60 | 60 | 70 | 50 |
| Methyl methacrylate | 20 | 20 | 20 | 10 | 20 |
| Butyl methacrylate | 20 | 20 | 20 | 20 | 20 |
| Acrylonitrile | 0 | 0 | 0 | 0 | 10 |
| Polyethylene glycol dimethacrylate | 0.3 | 1.0 | 0.01 | 0.3 | 0.15 |
| THF-insoluble gel, % | 15 | 30 | 1 | 14 | 7 |

EXAMPLES 1-5

A jacketed 100-liter stainless steel polymerizer was charged with a polymeric matting agent and a polyfunctional monomer, the type and amount of which are reported in Table 2, evacuated to vacuum, then charged with 100 parts of monomeric vinyl chloride. The contents were agitated for 60 minutes until the polymeric matting agent was dissolved or dispersed in the monomer.

The reactor was then charged with 200 parts of deionized water, 0.1 part of water-soluble partially saponified polyvinyl alcohol, and 0.2 part of di-2-ethylhexyl peroxydicarbonate. With stirring, the contents were heated to 57° C. by passing hot water through the jacket. Polymerization was continued while holding the temperature. The reaction was terminated when the pressure in the reactor dropped to 6.0 kg/cm²G. The unreacted monomer was recovered. The polymer slurry was taken out of the reactor, dehydrated and dried, obtaining a vinyl chloride polymer.

COMPARATIVE EXAMPLE 1

A vinyl chloride polymer was prepared from the same reactants by the same procedure as in Example 1 except that neither the polymeric matting agent nor the polyfunctional monomer was used.

COMPARATIVE EXAMPLE 2

A vinyl chloride polymer was prepared from the same reactants by the same procedure as in Example 1 except that the polymeric matting agent was omitted.

COMPARATIVE EXAMPLE 3

A vinyl chloride polymer was prepared from the same reactants by the same procedure as in Example 1 except that the polyfunctional monomer was omitted.

COMPARATIVE EXAMPLE 4

A vinyl chloride polymer was prepared from the same reactants by the same procedure as in Example 1 except that polymeric matting agent B was used instead of agent A.

COMPARATIVE EXAMPLE 5

A vinyl chloride polymer was prepared from the same reactants by the same procedure as in Example 1 except that polymeric matting agent C was used instead of agent A.

COMPARATIVE EXAMPLE 6

A vinyl chloride polymer was prepared from the same reactants by the same procedure as in Example 1 except that 30 parts of polymeric matting agent A was used.

The vinyl chloride polymers prepared in Examples 1-5 and Comparative Examples 1-6 were measured for roll retention time and compression set by the following methods. Extrusion molded parts were visually observed for surface state.

The results are shown in Table 2.

Roll Retention Time

A blend of 100 parts of a vinyl chloride polymer, 80 parts of dioctyl phthalate, 2 parts of calcium stearate, and 5 parts of epoxidized soybean oil was applied to a 3-inch roll at 160° C. and milled for 10 minutes. A stop watch was used to measure the roll retention time (sec.), that is, the time taken from the point when the blend was admitted to the roll mill to the point when the blend became apparently gelled on the roll surface.

Extruded Part Surface Appearance

The blend, to which 0.1 part of carbon black was further added, was extrusion molded into a sheet through an extruder having a diameter of 20 mm. The surface state of the extrusion molded part or sheet was visually observed.

Compression Set

The rolled sheet obtained in the roll retention time test was preheated at 185° C. for 7 minutes and press molded at 30 kg/cm² for 4 minutes. The molded sample was measured for compression set according to JIS K 6301 under the conditions: 70° C., 22 hours, and 25% compression.

TABLE 2

| No | Matting agent Type | Matting agent Amount | Polyfunctional monomer Type | Polyfunctional monomer Amount | Roll retention time (sec.) | Extruded parts surface appearance | Compression set |
|---|---|---|---|---|---|---|---|
| Example | | | | | | | |
| 1 | A | 10 | diallyl phthalate | 0.07 | 37 | uniformly matte | 56 |
| 2 | D | 1 | diallyl phthalate | 0.05 | 35 | uniformly matte | 58 |
| 3 | E | 5 | HGDA* | 0.1 | 36 | uniformly matte | 57 |
| 4 | D | 3 | HGDA* | 0.03 | 35 | uniformly matte | 58 |
| 5 | A | 7 | HGDA* | 0.01 | 36 | uniformly matte | 56 |
| Comparative Example | | | | | | | |
| 1 | — | — | — | — | 35 | lustrous | 65 |
| 2 | — | — | diallyl phthalate | 0.3 | 50 | matte, many fish-eyes | 60 |
| 3 | A | 10 | — | — | 37 | somewhat lustrous, not uniformly matte, varying surface appearance | 60 |
| 4 | B | 10 | Diallyl phthalate | 0.07 | 38 | matte, many fish-eyes | 55 |
| 5 | C | 10 | diallyl phthalate | 0.07 | 37 | somewhat lustrous, not uniformly matte, varying surface appearance | 58 |
| 6 | A | 30 | diallyl phthalate | 0.07 | 41 | somewhat lustrous, not uniformly matte, varying surface appearance | 55 |

*1,6-hexaglycol diacrylate

We claim:

1. A process for producing a matte vinyl chloride polymer comprising the step of suspension polymerizing a vinyl chloride monomer or a vinyl monomer mixture mainly comprising vinyl chloride in an aqueous medium in the presence of (A) 0.005 to 0.2 parts by weight of a polyfunctional monomer having at least two ethylenic double bonds in a molecule and (B) 0.1 to 20 parts by weight of a polymeric matting agent containing 3 to 25% by weight of a tetrahydrofuran-insoluble gel fraction per 100 parts by weight of the vinyl chloride monomer or the vinyl monomer mixture, said polymeric matting agent (B) being obtained by adding a polyfunctional monomer having at least two ethylene double bonds in a molecule to a non-crosslinking monomer mixture mainly comprising an aromatic vinyl monomer and an alkyl (meth)acrylate monomer and polymerizing the monomers.

2. The process of claim 1 wherein said vinyl monomer mixture comprises at least 50% by weight of vinyl chloride and a copolymerizable vinyl monomer.

3. The process of claim 1 wherein polyfunctional monomer (A) is selected from the group consisting of diallyl phthalate and 1,6-hexaglycol diacrylate.

* * * * *